(12) United States Patent
Tian et al.

(10) Patent No.: US 11,689,760 B2
(45) Date of Patent: Jun. 27, 2023

(54) METHODS AND DEVICES FOR COMMENT INFORMATION DISPLAY AND INTERACTION, ELECTRONIC APPARATUS, AND STORAGE MEDIUM

(71) Applicant: BEIJING BYTEDANCE NETWORK TECHNOLOGY CO., LTD., Beijing (CN)

(72) Inventors: Qiheng Tian, Beijing (CN); Xiaolu Wang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/872,224

(22) Filed: Jul. 25, 2022

(65) Prior Publication Data

US 2022/0360841 A1 Nov. 10, 2022

Related U.S. Application Data

(63) Continuation of application No. PCT/CN2021/075632, filed on Feb. 5, 2021.

(30) Foreign Application Priority Data

Feb. 7, 2020 (CN) .......................... 202010082941.X

(51) Int. Cl.
*H04N 21/431* (2011.01)
*H04N 21/437* (2011.01)
(Continued)

(52) U.S. Cl.
CPC ....... *H04N 21/4316* (2013.01); *H04N 21/437* (2013.01); *H04N 21/488* (2013.01); *H04N 21/8133* (2013.01)

(58) Field of Classification Search
CPC ............. H04N 21/4316; H04N 21/437; H04N 21/488; H04N 21/8133
See application file for complete search history.

(56) References Cited

U.S. PATENT DOCUMENTS

2012/0304223 A1* 11/2012 Sargent ............ H04N 21/44016
725/32
2017/0264585 A1 9/2017 Xu et al.
(Continued)

FOREIGN PATENT DOCUMENTS

CN 103034722 A 4/2013
CN 104967896 A 10/2015
(Continued)

OTHER PUBLICATIONS

International Search Report dated Apr. 22, 2021 in International Application No. PCT/CN2021/075632 (5 pages) with an English translation (3 pages).

(Continued)

*Primary Examiner* — Michael R Telan

(57) ABSTRACT

A method for comment information display includes steps described below: Comment information of a plurality of target videos in a video collection is acquired; a bullet comment file is generated according to the comment information; and in response to any target video in the video collection being played, the bullet comment file is loaded in segments according to a preset playing rule, and each piece of the comment information is displayed in a form of scrolling display of the bullet comment file.

19 Claims, 6 Drawing Sheets

(51) Int. Cl.
*H04N 21/488* (2011.01)
*H04N 21/81* (2011.01)

(56) References Cited

U.S. PATENT DOCUMENTS

| | | | |
|---|---|---|---|
| 2017/0289634 A1* | 10/2017 | E | H04N 21/4532 |
| 2019/0166394 A1 | 5/2019 | Lin | |
| 2019/0246165 A1* | 8/2019 | Brouwer | H04N 21/4728 |
| 2020/0213655 A1* | 7/2020 | Feng | G10L 15/30 |
| 2021/0185386 A1* | 6/2021 | Kong | H04N 21/4394 |

FOREIGN PATENT DOCUMENTS

| | | |
|---|---|---|
| CN | 105142031 A | 12/2015 |
| CN | 105916057 A | 8/2016 |
| CN | 105959816 A | 9/2016 |
| CN | 105992026 A | 10/2016 |
| CN | 106878793 A | 6/2017 |
| CN | 107071587 A | 8/2017 |
| CN | 110248258 A | 9/2019 |
| CN | 111246275 A | 6/2020 |

OTHER PUBLICATIONS

First Office Action dated Sep. 25, 2020 in Chinese Patent Application No. 202010082941.X (8 pages) with an English translation (10 pages).

Second Office Action dated Dec. 18, 2020 in Chinese Patent Application No. 202010082941.X (8 pages) with an English translation (12 pages).

\* cited by examiner

METHODS AND DEVICES FOR COMMENT INFORMATION DISPLAY AND INTERACTION, ELECTRONIC APPARATUS, AND STORAGE MEDIUM

CROSS-REFERENCE TO RELATED APPLICATION(S)

This is a continuation of International Patent Application No. PCT/CN2021/075632, filed on Feb. 5, 2021, which claims priority to Chinese Patent Application No. CN 202010082941.X filed with the China National Intellectual Property Administration (CNIPA) on Feb. 7, 2020, the disclosure of which is incorporated herein by reference in its entirety.

TECHNICAL FIELD

The present disclosure relates to the field of computer technologies and, in particular, to methods and apparatuses for comment information display and interaction, an electronic device and a storage medium.

BACKGROUND

As the pace of life accelerates, more and more users tend to watch short videos to obtain information. The display interface of a short video on the user side is often provided with a comment area for users to post their impressions of the video. The length of the comment area is generally unlimited, and the comment contents are rich and interesting. Therefore, many users choose to view the comment information when or after watching the video contents. However, to present more video information on a video navigation page, a comment page is generally placed on the next layer of a video playing page (an interactive path), that is, if a user wants to access the comments for a certain video, the user needs to access the comment area of the comment page from the video playing page to view and comment on the comments. This way of viewing the comments is long in path, making it difficult for users to quickly view the contents of corresponding comments.

In the related art, for loaded comment information, a long loading time is required to simultaneously display the video contents and the comment information, resulting in a situation where the comment information cannot be displayed smoothly during the playing process of short videos.

SUMMARY

A first aspect of the present disclosure provides a method for comment information display. The method includes steps described below.

Comment information of a plurality of target videos in a video collection is acquired.

A bullet comment file is generated according to the comment information.

In response to any target video in the video collection being played, the bullet comment file is loaded in segments according to a preset playing rule, and each piece of the comment information is displayed in a form of scrolling display of the bullet comment file.

A second aspect of the present disclosure provides a method for comment information interaction. The method includes steps described below.

Comment information is displayed according to the method for comment information display of any one of the above technical solutions.

An expansion instruction for a comment interface of any piece of the comment information is received, and the comment interface of the piece of the comment information is displayed on a current playing interface in response to the expansion instruction.

Lower-level comment information of any piece of the comment information is received on the comment interface.

A third aspect of the present disclosure provides an apparatus for comment information display. The apparatus includes a comment information acquisition module, a bullet comment file generation module and a display module.

The comment information acquisition module is configured to acquire comment information of a plurality of target videos in a video collection.

The bullet comment file generation module is configured to generate a bullet comment file according to the comment information.

The display module is configured to in response to any target video in the video collection being played, load the bullet comment file in segments according to a preset playing rule, and display each piece of the comment information in a form of scrolling display of the bullet comment file.

A fourth aspect of the present disclosure provides an apparatus for comment information interaction. The apparatus includes a comment information display module, a comment interface display module and a lower-level comment information module.

The comment information display module is configured to display comment information according to the method for comment information display of any one of the above technical solutions.

The comment interface display module is configured to receive an expansion instruction for a comment interface of any piece of the comment information, and display the comment interface of the piece of the comment information on a current playing interface in response to the expansion instruction.

The lower-level comment information module is configured to receive lower-level comment information of the piece of the comment information on the comment interface.

A fifth aspect of the present disclosure provides an electronic device. The device includes a memory and a processor.

The memory is configured to store a computer program.

The processor is configured to execute, when running the computer program, the method of the first aspect and the method of the second aspect.

A sixth aspect of the present disclosure provides a non-transitory computer-readable storage medium storing a computer program, where the program is configured to, when executed by a processor, implement the method of the first aspect and the method of the second aspect.

BRIEF DESCRIPTION OF DRAWINGS

The above and other features, advantages and aspects of embodiments of the present disclosure will become more apparent with reference to specific implementations described below in conjunction with drawings. Same or similar reference numerals in the drawings denote same or similar elements. It is to be understood that the drawings are schematic and that originals and elements are not necessarily drawn to scale.

DETAILED DESCRIPTION

Figure 1:
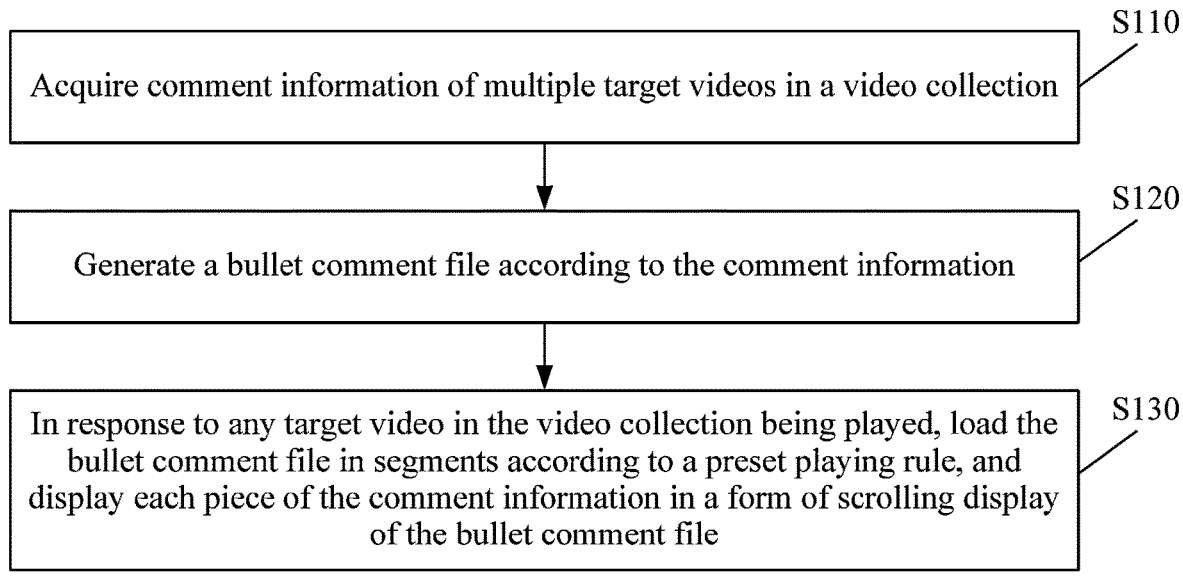
FIG. 1 is a flowchart of a method for comment information display according to an embodiment of the present disclosure.

Embodiments of the present disclosure is described as follows in detail with reference to the drawings. Although some embodiments of the present disclosure are shown in the drawings, it is to be understood that the present disclosure may be implemented in various forms; conversely, these embodiments are provided so that the present disclosure will be thoroughly and completely understood. It is to be understood that the drawings and embodiments of the present disclosure are merely for illustrative purposes.

It is to be understood that the various steps recorded in the method embodiments of the present disclosure may be performed in a different order, and/or in parallel. In addition, the method embodiments may include additional steps and/ or omit performing the illustrated steps.

As used herein, the term "comprise" and variations thereof are intended to be inclusive, that is, "include, but not limited to". The term "based on" indicates "at least partially based on". The term "one embodiment" means "at least one embodiment"; the term "another embodiment" means "at least one another embodiment"; the term "some embodiments" means "at least some embodiments". Related definitions of other terms will be given in the description below.

It is to be noted that references to "first", "second" and the like in the present disclosure are merely intended to distinguish apparatuses, modules or units and are neither intended to limit that the apparatuses, modules or units must be different apparatuses, modules or units, nor intended to limit the order or interrelationship of the functions performed by the apparatuses, modules, or units.

It is to be noted that references to modifications of "one" or "a plurality" mentioned in the present disclosure are intended to be illustrative; those skilled in the art should understand that "one or a plurality" should be understood as "one or more" unless clearly expressed in the context.

The technical solutions of the present disclosure and how the technical solutions of the present disclosure solve the above technical problems are described as follows in detail in embodiments. The embodiments described below can be combined with each other, and identical or similar concepts or processes may not be repeated in some embodiments. The embodiments of the present disclosure are described below in conjunction with the drawings.

Referring to FIG. 1, the present disclosure provides a method for comment information display. The flowchart of a method for comment information display in an embodiment is shown in FIG. 1. The method may be executed by an electronic device, the electronic device may be a terminal device, and the terminal device may be a computer device or a mobile terminal including a desktop device. The application scenario of the present disclosure is described below.

A client sends a video playing request to a server, receives to-be-played target videos and comment information associated with the to-be-played target videos sent by the server in response to the request, sequences comment information corresponding to multiple target videos in a video collection, generates a bullet comment file according to the sequenced comment information, loads the bullet comment file in segments according to a preset playing rule, and loads corresponding segments of the bullet comment file when a certain target video is played, so as to display the comment information while displaying the target video.

Optionally, a method for comment information display provided by an embodiment of the present disclosure shown in FIG. 1 includes steps described below.

In step S110, comment information of multiple target videos in a video collection is acquired.

In step S120, a bullet comment file is generated according to the comment information.

In step S130, in response to any target video in the video collection being played, the bullet comment file is loaded in segments according to a preset playing rule, and each piece of the comment information is displayed in a form of scrolling display of the bullet comment file.

Target videos provided by the present disclosure are optionally to-be-played short videos or audio files with associated display images. The multiple target videos in the video collection in step S110 may be video files having an association relationship including: the subject, keywords and other information of two video files are the same or corresponding, alternatively the multiple target videos may be video files having no association relationship. The multiple target videos may be displayed in the form of a playlist or a navigation page, and the comment information of the target videos may be displayed in the form of text, graphics, patterns, symbols and so on. The comment information may be all comment information for the target videos; the comment information may be screened part of the comment information according to a screening rule, such as screened hot comments, screened classic comments and so on; the comment information may also include lower-level comment information that comments on the comment information, that is, secondary comments (also referred to as second-level comments, re-comments and so on), tertiary comments, . . . , n-time comments and so on.

The client acquires comment information of multiple target videos and achieves preloading of the comment information, which is conducive to quickly loading corresponding comment information when a target video is played and shortening the loading time of the comment information, so as to smoothly display the comment information on a playing picture of the target video.

Additionally or alternatively, when the comment information of the target videos is acquired, it is also necessary to acquire a user identifier of the comment user. The user identifier includes: a user name, a user avatar, a user level, a user identity and other information, so that the information of the publisher of the comment information can be identified through the user identifier.

In step S120, a bullet comment file is generated according to the comment information. In the solution provided by the present disclosure, optionally, the step in which the bullet comment file is generated after the comment information is sequenced includes two cases described below.

In case one, the comment information is segmented first to form multiple comment information segments, and each comment information segment corresponds to a target video. Then, the comment information segments are sequenced based on a playing order of the target videos to form a bullet comment file, and the corresponding comment information is loaded and played according to the playing order of the target videos in the video collection. This case may be applied to all videos, regardless of whether the target videos in the video collection are related to each other.

In case two, the comment information is sequenced according to a preset sequencing rule, and a bullet comment file is formed based on the sequenced comment information. When the target videos in the video collection are played, the comment information is played through scrolling according to the sequencing order. In this case, the comment information and the target videos may not be displayed correspondingly, that is, comment information of target videos ranking lower in the playing order may be displayed on target videos ranking higher in the playing order. This case is only applicable to the target videos having an association relationship in the video collection.

Corresponding to the above cases, step S130 in which the each piece of the comment information in the form of the scrolling display of the bullet comment file is displayed includes two cases described below.

For the above case one, the comment information segment corresponding to each target video is formed, and a bullet comment file to be played through scrolling is formed based on the comment information segment. In response to any target video being played on a video playing interface, comment information corresponding to the target video currently being played is displayed on the video playing interface in the form of the scrolling display of the bullet comment file, so that what is displayed on the target video is the comment information related to the target video.

For the above case two, mixed comment information is sequenced according to a preset sequencing rule. In response to any target video being played on a video playing interface, comment information corresponding to multiple target videos in the video collection is displayed on the video playing interface in the form of the scrolling display of the bullet comment file. In this display manner, comment information may not be played corresponding to the corresponding target video; when a target video is played, comment information corresponding to multiple target videos may be displayed through scrolling on the target video, so that it is convenient for the user to pre-know the content of subsequent to-be-played target videos based on the comment information displayed on a current playing interface.

The preset playing rule in step S130 includes that target videos in a playlist or navigation page are played sequentially, or one target video in a playlist or navigation page is played in a loop.

In the present disclosure, a sequencing result of each piece of comment information is determined based on the playing order of target videos, that is, the playing order of the target videos is consistent with the sequencing order of the comment information segments. When the target videos are played sequentially, it is merely necessary to load the corresponding comment information segments sequentially to display the comment information segments corresponding to the target videos, and it is not necessary to call a mapping relationship between the target videos and the comment information segments. Then, operations corresponding to comment information segments are determined according to to-be-played target videos, so that the loading time of the corresponding comment information segments is reduced, and the efficiency of loading the bullet comment file is improved. When any target video in the video collection is played in a loop, the played target video is played back. In this case, according to a playing history, comment information corresponding to the target video is called back for bullet comment display, so that the target video and the corresponding comment information are displayed simultaneously. In addition, the order of comment information in the bullet comment file remains unchanged, so that it is not necessary to load the bullet comment file again, which is conducive to reducing the loading time of the corresponding comment information.

Moreover, according to the solution of the present disclosure, when target videos are switched to play, the step in which the bullet comment file is loaded in segments according to the preset playing rule may be achieved through steps described below.

In step A1, in response to any target video being switched to a next target video in the video collection, a loading position of displayed comment information of the bullet comment file loaded before switching is acquired.

In step A2, in response to switching to and playing the next target video, loading the bullet comment file in segments is continued from the loading position according to the preset playing rule.

According to the solution provided by the embodiment of the present disclosure, when target videos are switched, subsequent bullet comment file segments in the bullet comment file are loaded sequentially. For example, when target video 1 is completely played, the bullet comment file is loaded to S1 of the bullet comment file; when target video 2 is switched to play, the bullet comment file is loaded sequentially from S1. In this way, when different target videos are played, it is avoided to repeatedly load the same bullet comment file segment, that is, it is avoided to repeatedly display the same comment information on different target videos.

In the present disclosure, through the scrolling display of the bullet comment file, each target video and each piece of comment information are displayed correspondingly, that is, while the target video is played, the corresponding comment information is displayed in the form of bullet comments. Before that, a playing starting point of the bullet comment file is aligned with a preset occasion of a to-be-played target video, so that the to-be-played target video can be played synchronously with the comment information when the to-be-played target video is played to the preset occasion. The preset occasion may be set to be the same as a starting point of the target video, or set to s seconds after the target video starts being played, and s is a positive integer.

When the target videos in the video collection are played, after a target video is completely played, the next target video in the playlist and bullet comment file segments corresponding to the target video in the bullet comment file are loaded, so that the target video and corresponding comment information are displayed correspondingly. Since the bullet comment file has been preloaded in step S110, when the next target video is played, the corresponding comment information in the bullet comment file can be quickly loaded, so that the loading rate of the comment information corresponding to the target video can be improved.

In addition, in the present disclosure, to-be-displayed comment information is integrated into the form of a bullet comment file, that is, a bullet comment file collects comment information corresponding to multiple target videos. When a target video in a video collection is displayed, the corresponding bullet comment file is loaded, and the comment information in the bullet comment file is sequentially displayed through scrolling on a playing interface. Compared with the manner that a bullet comment file corresponds to a single video in the related art, the present disclosure provides a new manner for bullet comment display.

To more clearly disclose the solution for comment information display, the solution for comment information interaction, and technical effects provided by the present disclosure, specific implementation solutions will be described in detail with multiple embodiments.

Figure 2:
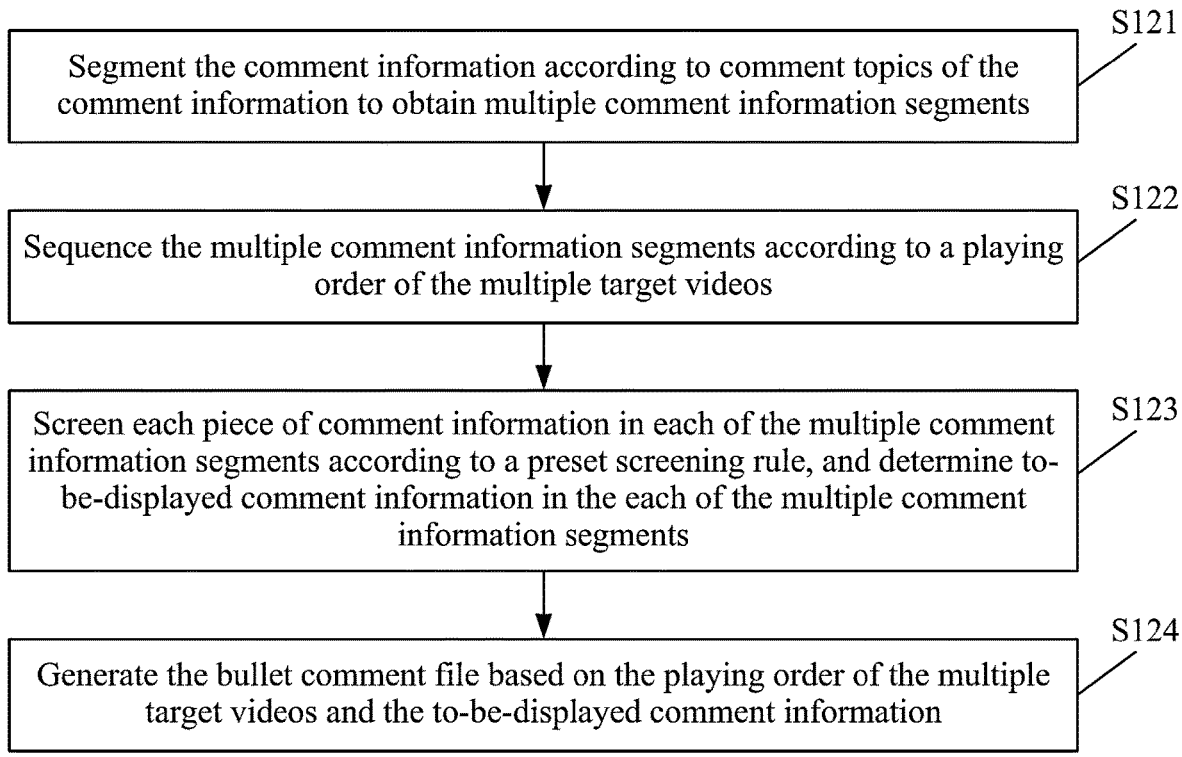
FIG. 2 is a flowchart of sequencing comment information to generate bullet comment information according to an embodiment of the present disclosure.

For the above case one, in an implementation, step 120 in which the comment information is sequenced to generate bullet comment information, may be achieved in the manner described below, and the flowchart is shown in FIG. 2. The step 120 includes:

In step S121, the comment information is segmented according to comment topics of the comment information to obtain multiple comment information segments.

In step S122, the multiple comment information segments are sequenced according to a playing order of the multiple target videos.

In step S123, each piece of comment information in each of the multiple comment information segments is screened according to a preset screening rule, and to-be-displayed comment information in the each of the multiple comment information segments is determined.

In step S124, the bullet comment file is generated based on the playing order of the multiple target videos and the to-be-displayed comment information.

According to the comment topics or comment objects of the comment information, the comment topics or comment objects are the identifier of the target videos. When the comment information of the target videos is acquired, the identifier of the comment topics of the target videos may be added, so that the comment information can be segmented subsequently based on the comment identifier, to obtain multiple comment information segments.

The comment information is segmented according to the comment topics or comment objects to form multiple comment information segments corresponding to the target videos, the multiple comment information segments are sequenced according to the playing order of the target videos, and a sequencing result of the multiple comment information segments is obtained, so that the sequencing order of the comment information segments is consistent with the playing order of the target videos.

Each comment information segment includes at least one piece of comment information. Further, to clarify a playing order of each piece of comment information in each comment information segment, it is also necessary to screen the each piece of comment information. The standard for screening the comment information may be a heat value, number of comments, number of likes and so on of each piece of comment information.

For each piece of comment information in each comment information segment, each piece of comment information is screened according to a preset screening rule, and to-be-displayed comment information in the each comment information segment is determined. Since the to-be-displayed comment information needs to be displayed on a screen in the form of bullet comments, to-be-displayed comment information that suitable for bullet comment display is screened out from several pieces of comment information. For example, several pieces of comment information with higher heat values may be set as the to-be-displayed comment information.

Additionally or alternatively, the method may further include, before step S122, the playing order of each target video in the playlist is acquired. The playing order may be obtained by sequencing according to a preset rule. Comment information for each target video is acquired through step S110. If the comment information includes all comment information of each target video, the step in which the bullet comment file is generated according to the comment information, includes not only the sequencing of the comment information segment corresponding to each target video, but also the sequencing of each piece of comment information in each comment information segment, so that a playing order of each comment information segment, and a playing order of each piece of comment information in the each comment information segment are clarified.

Optionally, based on the playing order of each target video, the comment information segment corresponding to the each target video is sequenced, and a bullet comment file is generated based on the sequenced comment information. The generated bullet comment file includes the comment information segment corresponding to the each target video, and each comment information segment includes hot comments and classic comments screened according to a preset screening rule and/or sequenced according to a preset sequencing rule, and may include lower-level comment information for the hot comments or the classic comments. A hot comment is taken as an example. Lower-level comment information for the hot comment is folded in the bullet comment file, and only the hot comment is displayed on a playing interface. When an expansion instruction of the hot comment is received, the lower-level comment information of a comment page displayer of the hot comment is expanded. Due to the limited playing time of short videos, the number and length of pieces of comment information played through scrolling on a target video playing picture are limited. Therefore, according to the present disclosure, after the comment information in the bullet comment file is screened, comment information conforming to the number and length for display is selected, so that the number of pieces of comment information displayed corresponding to a target video is improved, and the user experience is improved.

According to the solution for comment information display of the embodiment of the present disclosure, each target video and each piece of comment information are displayed correspondingly, and the comment information of the target video is displayed through scrolling in the form of bullet comments, so that the target video and the corresponding comment information are displayed simultaneously.

According to the solution for comment information display of the present disclosure, comment information of all target videos is acquired, all comment information is preloaded, and the comment information is sequenced according to a playing order of the target videos, so that corresponding segments of the bullet comment file can be quickly loaded when target videos are played. The comment information in the bullet comment file is preloaded and sequenced, which is conducive to reducing the loading time of each piece of comment information in the bullet comment file and improving the display efficiency of comment information displayed on a target video playing picture.

Moreover, in the present disclosure, the bullet comment file only needs to be retrieved once to load the comment information of all target videos. In this way, the efficiency of loading the comment information is improved, and the problem is solved that the comment information cannot be displayed in the form of bullet comments due to the long loading time of the comment information.

Additionally or alternatively, several pieces of comment information with higher heat values may be filtered to form to-be-displayed comment information whose number of words and content satisfies a standard for bullet comment display, and the comment information with repeated content is filtered out at the same time.

Additionally or alternatively, in the present disclosure, screened and filtered to-be-displayed comment information may be sequenced. The to-be-displayed comment information may be sequenced according to the heat values of the comment information, and the higher the heat value, the higher the ranking. The to-be-displayed comment information may also be sequenced according to a reception time, and the earlier the comment information is received, the higher the ranking of the comment information is. The to-be-displayed comment information may also be sequenced in other self-defined manners, and the above is only examples.

The to-be-displayed comment information of the present disclosure is obtained through screening, filtering and sequencing on comment information. Screened to-be-displayed comment information may be used for displaying hot comments or classic comments, and then the screened to-be-displayed comment information is filtered, so that the number of words and content of the to-be-displayed comment information satisfies the standard of displaying bullet comments on short videos.

The step in which the bullet comment file is generated after the comment information is sequenced according to the above method includes: sequencing comment information segments in a sequencing order which is the same as the playing order of target videos; screening each piece of comment information in the comment information segment so that the subsequently loaded to-be-displayed comment information can be directly displayed on the playing picture of the target video. In this way, users can directly acquire related comment information while viewing the target video, the loading time of the comment information is reduced, and the loading efficiency is improved.

Figure 3:
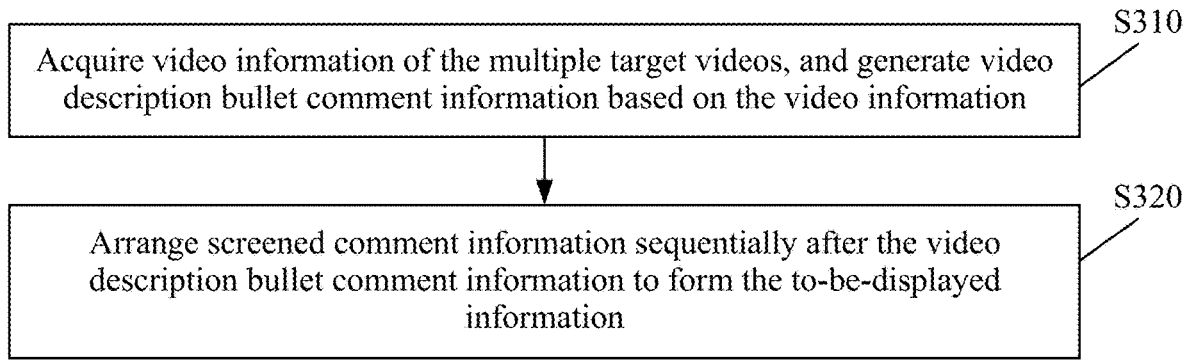
FIG. 3 is a flowchart of determining to-be-displayed comment information in each comment information segment according to an embodiment of the present disclosure.

Additionally or alternatively, the step S123 in which to-be-displayed comment information in each comment information segment is determined may be achieved through the manner described below, and the flowchart is shown in FIG. 3. The step S123 includes:

In step S310, video information of the multiple target videos is acquired, and video description bullet comment information is formed based on the video information.

In step S320, screened comment information is arranged sequentially after the video description bullet comment information to form the to-be-displayed information.

The video information of the target videos includes: a video title, video content information, video publisher related information, a video size, a video classification, a video score and other information, and video description bullet comments include at least one of the title of the target videos or the video content information, so that users can know the main information or a brief introduction of the video.

According to the solution of the present disclosure, video description comments are formed based on the video information of the target videos, and the video description bullet comments are arranged in the first place for bullet comment display. That is, for each target video, when the corresponding bullet comment file is played, video description bullet comments of the target video is played first, and then screened comment information is displayed. The comment information has been sequenced according to the preset sequencing rule, so that users can understand the video information of the target video and the comment information of the target video by watching to-be-displayed comment information played through scrolling.

Figure 4:
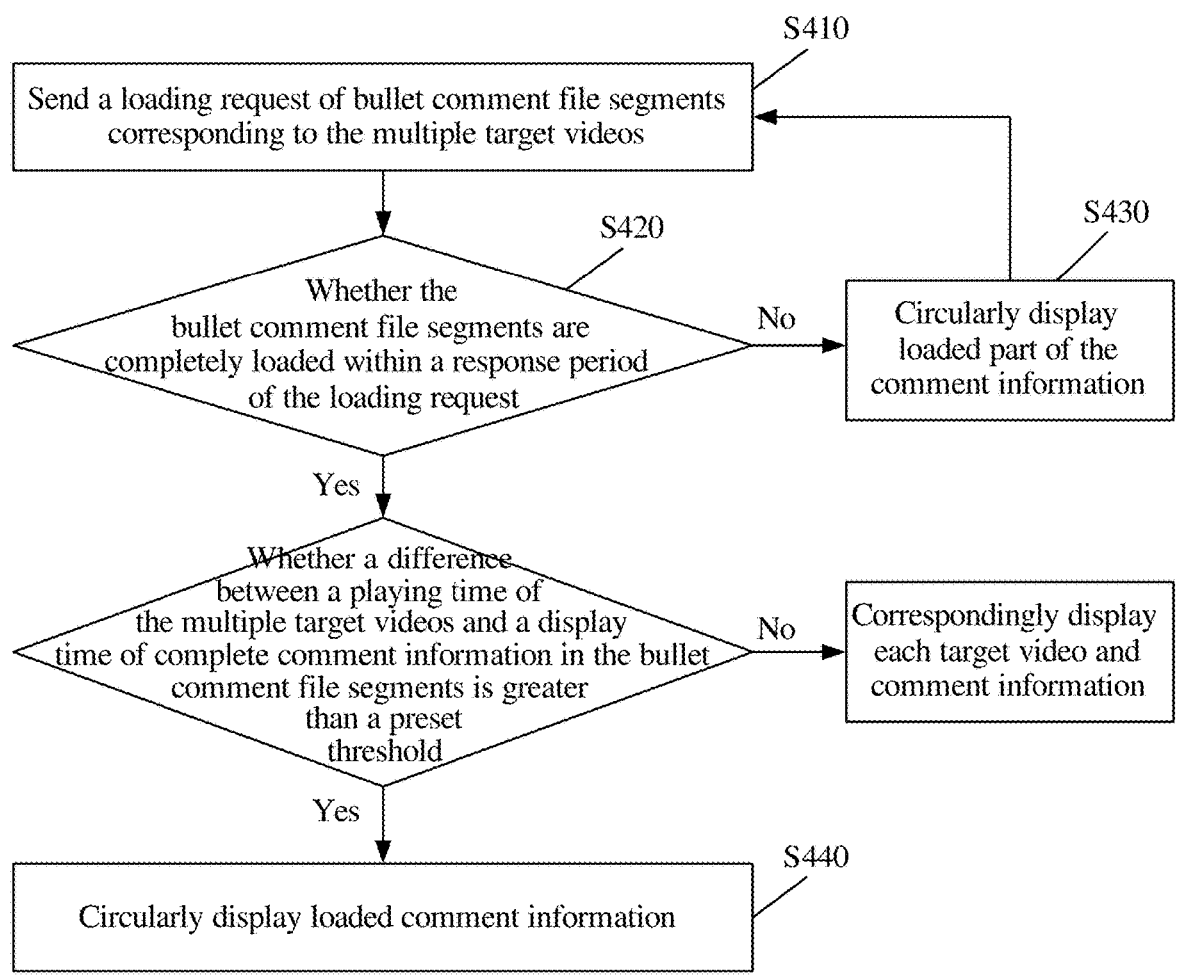
FIG. 4 is a flowchart of loading a bullet comment file in segments according to a preset playing rule, and displaying each piece of comment information in a form of scrolling display of the bullet comment file according to an embodiment of the present disclosure.

In an optional embodiment, step S130 in which the bullet comment file is loaded in segments according to the preset playing rule, and each piece of the comment information is displayed in the form of the scrolling display of the bullet comment file includes steps described below, and the flowchart is shown in FIG. 4. The step S130 includes:

In step S410, a loading request of bullet comment file segments corresponding to the multiple target videos is sent.

In step S420, whether the bullet comment file segments are completely loaded within a response period of the loading request is determined.

In step S430, if not, loaded part of the comment information is circularly displayed, and a request for loading remaining comment information contained in the bullet comment file segments is sent.

In step S440, if yes, and it is detected that a difference between a playing time of the multiple target videos and a display time of complete comment information in the bullet comment file segments is greater than a preset threshold, loaded comment information is circularly displayed.

For a target video, a loading request of bullet comment file segments corresponding to the target video is sent, and whether the bullet comment file segments received within a response period of the loading request contains complete comment information is detected first. If yes, a difference between a playing time of the target video and a display time of completely displaying the comment information is detected; if the difference between the playing time of the target video and the display time of the complete comment information is not greater than a preset threshold, each target video and comment information are displayed correspondingly; if the difference between the playing time of the target video and the display time of the complete comment information is greater than a preset threshold, where the difference between the playing time of the target video and the display time of the loaded comment information is greater than a preset threshold, which refers to the situation that the playing time of the target video exceeds a preset display time of the comment information, that is, the playing time of the comment information is relatively short, and before the target video is completely played, more comment information can be displayed. In this situation, loaded comment information is circularly displayed.

If the bullet comment file segments are not completely loaded within the response period of the loading request, the loaded comment information is circularly displayed, and a request for loading remaining comment information contained in the bullet comment file segments is sent; when the corresponding bullet comment file segments are completely loaded, the complete comment information is acquired.

According to the solution of the embodiment of the present disclosure, in a weak network situation, if the comment information is not completely loaded within the response period of the loading request and the comment information in the bullet comment file is relatively less, the loaded comment information is circularly displayed to ensure that there is comment information displayed on the playing picture of the target video.

In an optional embodiment, the method further includes: before the step S130 in which each piece comment information is displayed in the form of the scrolling display of the bullet comment file, steps described below to execute.

In step B1, a heat value of the each piece of the comment information is acquired.

In step B2, the heat value is displayed at the top of a comment panel corresponding to the each piece of the comment information.

Participation times of each piece of comment information are counted. The participation times include editing and viewing times of the comment information, where the editing of the comment information includes forwarding, commenting, giving a like, collection and other operations. The heat value of the comment information is determined based on the participation times, and the participation times of the comment information is in direct proportion to the heat value. The heat value of each piece of comment information is displayed at the top, which is convenient for users to quickly understand the heat value of the comment information.

The solution of the above embodiment is a solution for correspondingly displaying the target video and the comment information of the target video. If the video collection includes multiple target videos having an association relationship, that is, the multiple target videos in the video collection are associated with each other, where the multiple target videos includes two or more target videos, the bullet comment file may be generated according to the comment information through the solution described below.

In step C1, the comment information is screened and sequenced according to a preset screening rule and a preset sequencing rule to determine to-be-displayed comment information.

In step C2, the bullet comment file of the video collection is generated based on the to-be-displayed comment information.

Related target videos are target videos satisfying a preset association rule. The preset association rule may be that two videos have the same keywords, topic and so on. For example, target videos have the same topic may form a video collection; for example, if "character X", "character Y" and "character Z" appear in keywords of a target video, videos including any of the above keywords in the video keywords are related videos of the target video, and a video collection is formed based on the related videos. In this way, it is convenient to form video collections in line with user preferences and improve the user experience.

According to the solution of the embodiment of the present disclosure, acquired comment information may be screened and sequenced according to a preset screening rule and a preset sequencing rule. Alternatively, comment information segments corresponding to target videos in the video collection may be acquired first, these comment information segments are mixed, and the mixed comment information segments are screened according to a preset screening rule; the comment information is optionally screened according to the above preset screening rule and is sequenced according to the above sequencing rule; then, to-be-displayed information having a sequencing order is obtained, and the bullet comment file is generated according to the above generation rule and based on the to-be-displayed comment information.

According to the solution of the present disclosure, when the first target video in the video collection is played, comment information corresponding to the target video ranking last in the playing order of the video collection may be displayed. In this way, it is convenient for users to pre-know comment information of target videos ranking differently in the playing order, comment information with the highest heat value of each piece of comment information can be displayed in the first-played target video, thus the attraction of the video collection can be enhanced, and the playing probability and playing time of the video collection can be improved.

In an optional embodiment, the method further includes: after the step S130 in which each piece comment information is displayed in the form of the scrolling display of the bullet comment file, steps described below to execute.

In step D1, a hot video related to a currently played target video is acquired in real time.

In step D2, associated information between the target video and the hot video is acquired, and video description information of the hot video is formed based on the associated information.

In step D3, the video description information is displayed in a preset region of a target video display interface.

In step D4, a display instruction of the hot video is received in the preset region, and the hot video is played in response to the display instruction.

A video related to a currently played target video is acquired in real time according to a preset association rule. The preset association rule may be that two videos have the same keywords, topic and so on. If multiple videos are related to the currently played target video, videos that satisfy a condition are screened out according to a preset screening condition, such as a video with the highest heat value, that is, a hot video; or videos whose preset priority is higher than a current target video, like emergency videos, videos notifying major events, etc. According to the embodiment of the present disclosure, the hot video related to the current target video is acquired in real time, and association information between the target video and the associated hot video is acquired, where the association information may be video topics and keywords. Video description information of the hot video is formed based on the association information, which is conducive to improving the view counts of the hot video. The video description information is displayed in a preset region of a target video display interface, where the preset region may be any position of the display interface, such as the lower left, upper right and left side of the display interface, so that users can send a display instruction for the hot video through the preset region. The terminal plays the hot video in response to the display instruction, and thus the view counts of the hot video and the user stickiness of the hot video are improved.

Figure 5A:
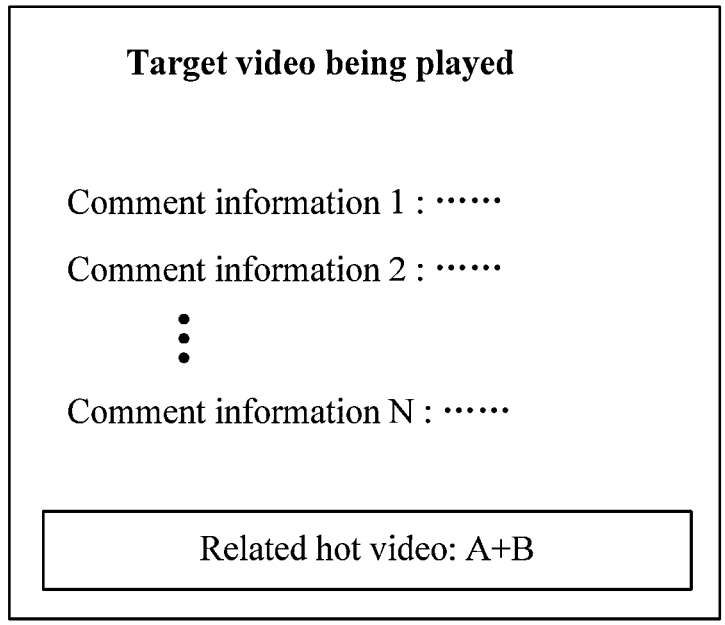
FIG. 5A is a diagram showing an interface of a target video according to an embodiment of the present disclosure, which focuses on displaying video description information of a hot video on a display interface.
Figure 5B:
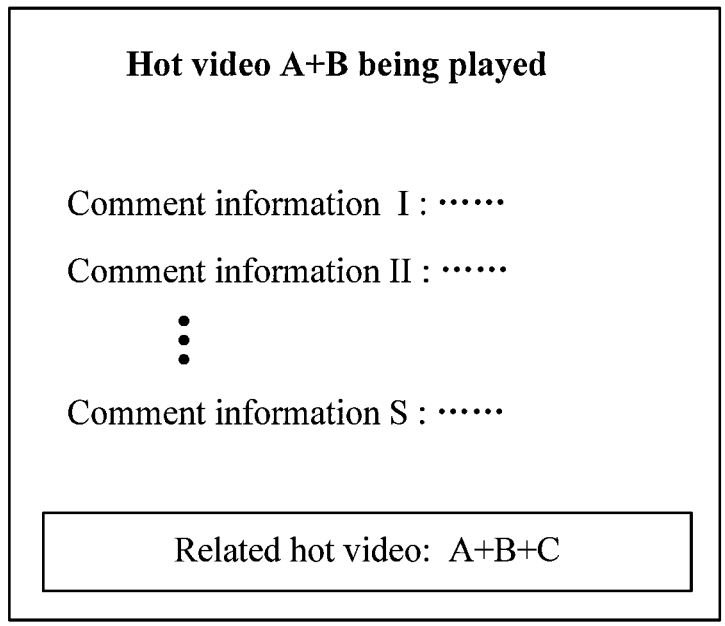
FIG. 5B is a diagram showing an interface of a hot video according to an embodiment of the present disclosure.

The solution of the embodiment may be illustrated through the diagram showing an interface in FIG. 5. FIG. 5A is a diagram showing a display interface of a target video where a hot video is displayed. On the diagram showing the display interface, a target video is played, comment information 1, comment information 2, . . . comment information N are played through scrolling on the playing interface of the target video, and video description information of a related hot video A+B is shown at the bottom of the playing interface. A+B is a keyword in the video description information, and the diagram uses A+B to characterize the video description information of the hot video. FIG. 5B is a diagram showing an interface of the hot video. On the diagram showing the interface of the hot video, comment information i, comment information ii, . . . , comment information s corresponding to the hot video and video description information of another hot video A+B+C related to the hot video are played through scrolling. A+B+C characterizes the video description information of another hot video. For example, the content of the target video is that character X is being interviewed, and thus keywords "character X", "concert" and "character Y" appear in this interview video. The keywords may be formed according to the content of the video, and a related hot video is retrieved in real time according to these keywords. Video description information that "character X considers inviting character Y in a concert" of the related hot video is displayed at the lower left of the current display interface, then a display instruction of the hot video is received in the region of the video description information such as a display instruction formed by operations of clicking, sliding, etc., and then a video whose video description information is that "character X considers inviting character Y in a concert" is played in response to the display instruction.

The solution of the embodiment of the present disclosure may be applied to the display of multiple target videos not having an association relationship, and may be applied to the display of target videos having an association relationship. Video description information of a related hot video is displayed in a preset region of a target video display interface so that users can send a display instruction of the related hot video by operations such as clicking in the region of the video description region, and then the terminal displays the hot video in response to the display instruction.

Figure 6:
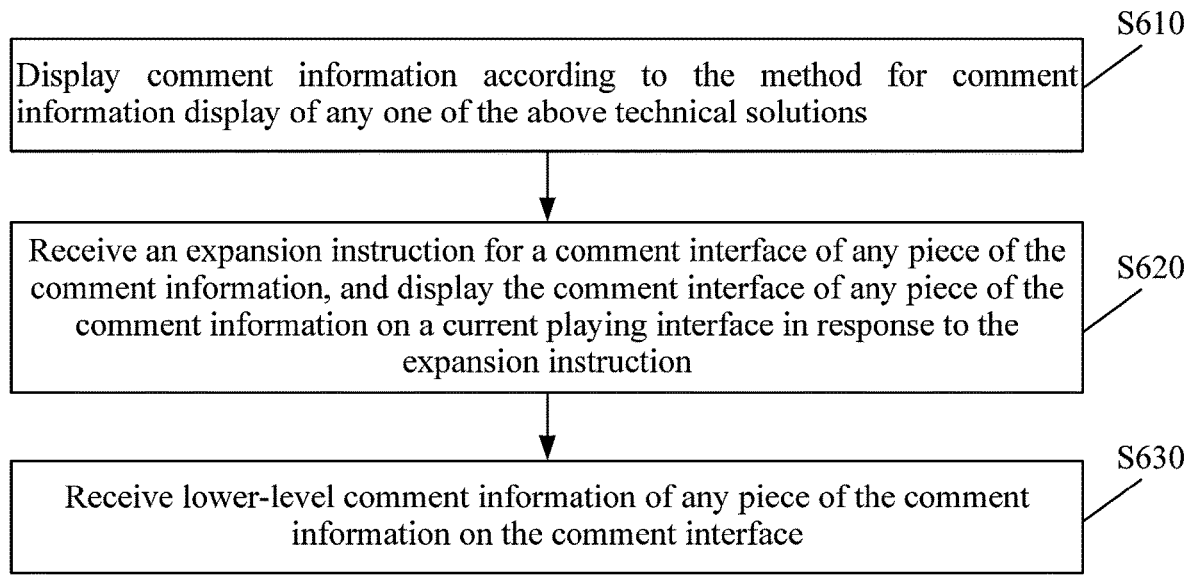
FIG. 6 is a flowchart of a method for comment information interaction according to an embodiment of the present disclosure.

Additionally or alternatively, the present disclosure further provides a method for comment information interaction. The flowchart of a method for comment information interaction of an embodiment is shown in FIG. 6, and the method includes steps described below.

In step S610, comment information is displayed according to the method for comment information display of any one of the above technical solutions.

In step S620, an expansion instruction for a comment interface of any piece of the comment information is received, and the comment interface of the piece of the comment information is displayed on a current playing interface in response to the expansion instruction.

In step S630, lower-level comment information of the piece of the comment information is received on the comment interface.

According to the method for comment information interaction of the embodiment of the present disclosure, when the comment information is displayed through scrolling on a playing interface of a current target video, it is detected that the terminal receives an expansion instruction for displaying a comment interface of any piece of the comment information, where the expansion instruction may be an instruction formed by operations such as clicking, touching and so on; then, the comment interface of the comment information is displayed on a current playing interface, where the comment interface includes lower-level comment information of the comment information and a comment area; and the terminal may receive the lower-level comment information of the comment information on the comment interface, where the lower-level comment information may be multi-level comment information. Optionally, the formed lower-level comment information of the comment information in a comment area of the comment interface is received. The formation of the lower-level comment information of the comment information constitutes the interaction of the comment information, which is conducive to improving the heat value of the comment information and enhancing the interaction between different users.

Figure 7A:
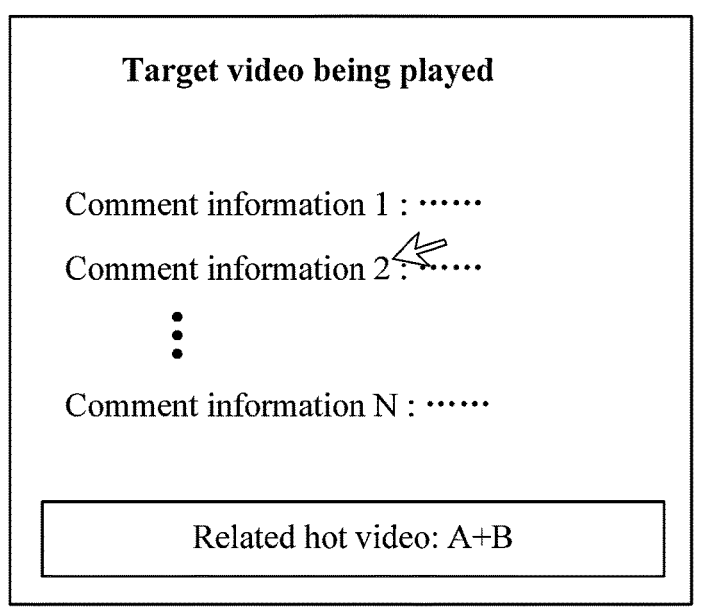
FIG. 7A is a schematic diagram of receiving an expansion instruction for a comment interface of any piece of comment information according to an embodiment of the present disclosure.
Figure 7B:
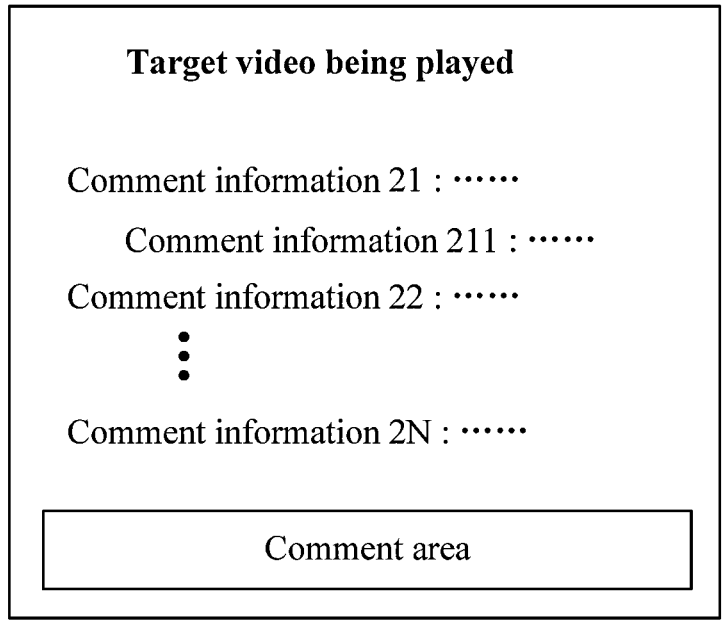
FIG. 7B is a schematic diagram of displaying a comment interface of the piece of comment information on a current playing interface in response to an expansion instruction according to an embodiment of the present disclosure.

The schematic diagram of an interaction process of an optional embodiment is shown in FIG. 7. FIG. 7A is a schematic diagram of receiving an expansion instruction for a comment interface of any piece of comment information, such as receiving an expansion instruction for comment information 2, like an expansion instruction for the comment interface of comment information 2 that "why do I giggle at the screen". FIG. 7B is a schematic diagram of displaying a comment interface of any piece of comment information on a current playing interface in response to an expansion instruction. Lower-level comment information (such as comment information 21, comment information 22, . . . , comment information 2N) and a comment area appear on the comment interface. For example, lower-level information of one piece of comment information is displayed on the comment interface, such as "character X thinks: sister's voice is also . . . ", and lower-level comment information (such as comment information 211) of the lower-level comment information is also displayed, such as "hahaha, you're right. I guess that's what he thinks", etc. In FIG. 7B, a comment area exists below the lower-level comment information. The lower-level comment information of the comment information or lower-level comment information of any piece of lower-level comment information may be input through the comment area. The right side of the comment area is also provided with an @ symbol and emoticons. Comment contents may be quickly input in the comment area and an @ object and emoticons are added to enable target objects to see the lower-level comment information.

Alternatively or alternatively, for ease of users inputting lower-level comment information of comment information, step S630 in which lower-level comment information of any piece of the comment information is received on the comment interface includes the step described below. The step S630 includes:

On the expanded comment interface, an anchor point having a positioning identifier is displayed to a comment area of the expanded comment interface.

According to the solution of the embodiment of the present disclosure, the expanded comment interface is configured for the client inputting comment information, and the input of to-be-input comment information is performed in the comment area. For ease of description, comment information targeted by the to-be-input comment information is referred to as to-be-commented information, and the to-be-commented information may be bullet comment information displayed, or lower-level comment information of the comment information.

An anchor point having a positioning identifier is displayed on the current display interface. For example, highlight and flicker, or different colors are used to identify a current position of the anchor point, so that an input position of the to-be-input comment information and a position of the to-be-commented information are clarified, a deviation of a corresponding relationship between the to-be-input comment information and the to-be-commented information is avoided, and accurate positioning of the input position of the to-be-input comment information and the position of the to-be-commented information is achieved.

In an optional embodiment, the method may further include, after the step S620 in which the comment interface of any piece of the comment information is displayed on a current playing interface in response to the expansion instruction of step S620, the step described below to execute.

Scrolling display of multiple pieces of comment information on the playing interface is stopped when a triggering operation of closing the comment interface is detected.

Comment information is displayed on the playing interface of a target video being played. In this process, if an expansion instruction for a certain piece of comment information is received, the comment interface of the certain piece of comment information is expanded and displayed in response to the expansion instruction. On the comment interface, lower-level comment information for commenting on the certain piece of comment information may be displayed, or an editing interface for commenting on the certain piece of comment information may also be displayed, so that users can comment on the certain piece of comment information. At the same time, scrolling playing of multiple pieces of comment information is paused, and when a triggering operation, such as clicking, sliding and so on, of closing the comment interface is detected, the scrolling playing of the bullet comment file on the video playing picture is resumed.

According to the solution, after the client receives the expansion instruction for the comment information, the comment information and lower-level comment information of the comment information are displayed on the current interface, so that the user can view the complete information of the comment information. The playing of the bullet comment file is paused while the comment interface is expanded, so as to avoid the user missing other comment information in the process of viewing the expanded comment information. When the comment interface is closed, the comment information in the bullet comment file is continuously displayed.

Figure 8:
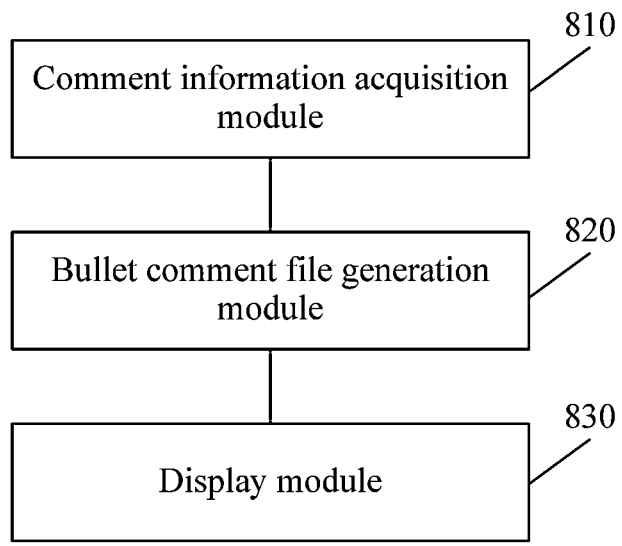
FIG. 8 is a structural diagram of an apparatus for comment information display according to an embodiment of the present disclosure.

FIG. 8 shows an apparatus for comment information display according to another embodiment of the present disclosure. As shown in FIG. 8, the apparatus of the embodiment of the present disclosure includes a comment information acquisition module 810, a bullet comment file generation module 820 and a display module 830.

The comment information acquisition module 810 is configured to acquire comment information of multiple target videos in a video collection.

The bullet comment file generation module 820 is configured to generate a bullet comment file according to the comment information.

The display module 830 is configured to in response to any target video in the video collection being played, load the bullet comment file in segments according to a preset playing rule, and display each piece of the comment information in a form of scrolling display of the bullet comment file.

As for the apparatus for comment information display in the above embodiments, the specific manner of the execution operation of each module has been described in detail in the embodiments of the method, which will not be described in detail herein.

Figure 9:
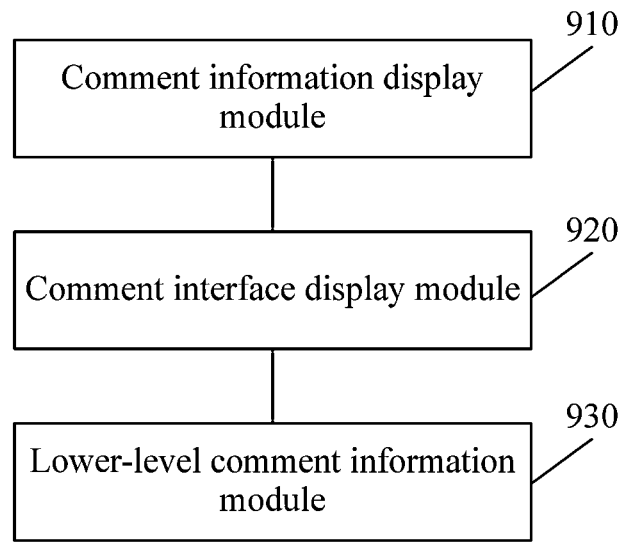
FIG. 9 is a structural diagram of an apparatus for comment information interaction according to an embodiment of the present disclosure.

FIG. 9 shows an apparatus for comment information interaction according to another embodiment of the present disclosure. The apparatus of the embodiment of the present disclosure includes a comment information display module 910, a comment interface display module 920 and a lower-level comment information module 930, which are described below:

The comment information display module 910 is configured to display comment information according to the method for comment information display of any one of the above technical solutions.

The comment interface display module 920 is configured to receive an expansion instruction for a comment interface of any piece of the comment information, and display the comment interface of any piece of the comment information on a current playing interface in response to the expansion instruction.

The lower-level comment information module 930 is configured to receive lower-level comment information of the piece of the comment information on the comment interface.

As for the apparatus for comment information interaction in the above embodiments, the specific manner of the execution operation of each module has been described in detail in the embodiments of the method, which will not be described in detail herein.

Figure 10:
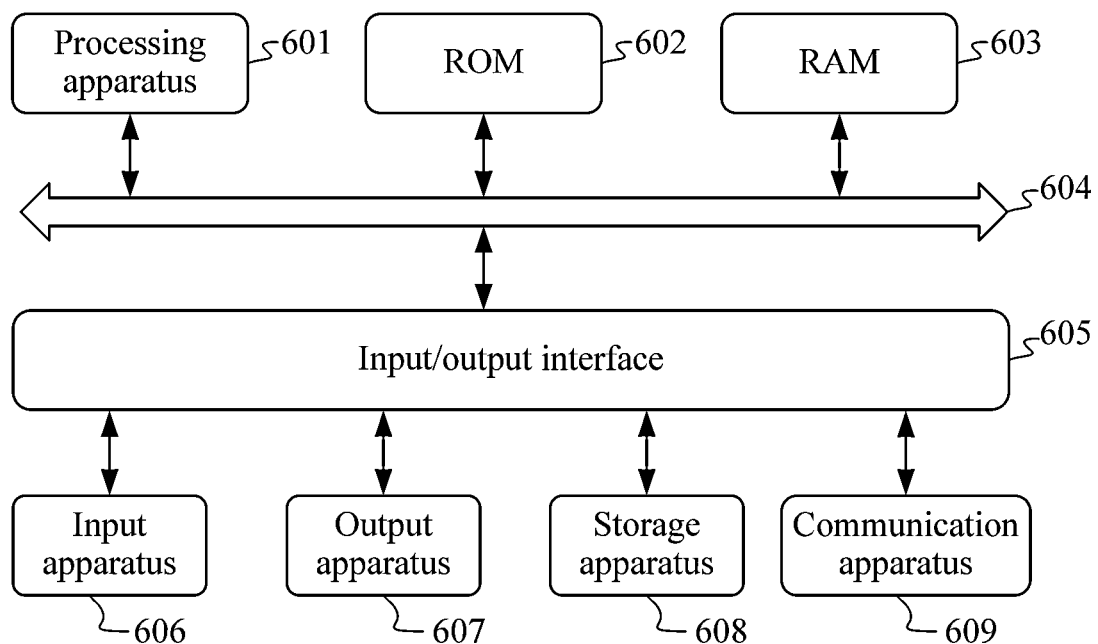
FIG. 10 is a structural diagram of an electronic device according to an embodiment of the present disclosure.

Referring to FIG. 10, FIG. 10 shows a structural diagram of an electronic device (such as the terminal device 600 in FIG. 10) applicable to implementing the embodiments of the present disclosure. A terminal device in the embodiments of the present disclosure may include a mobile terminal such as a mobile phone, a laptop, a digital broadcast receiver, a personal digital assistant (PDA), a PAD, a portable media player (PMP) and a vehicle-mounted terminal (such as a vehicle-mounted navigation terminal) and a fixed terminal such as a digital television (TV) and a desktop computer. The electronic device shown in FIG. 10 is merely an example.

The electronic device includes a memory and a processor, where the processor may be referred to as a processing apparatus 601 hereinafter, and the memory may include at least one of a read-only memory (ROM) 602, a random-access memory (RAM) 603 or a storage apparatus 608 hereinafter, which are described below.

As shown in FIG. 10, the electronic device 600 may include the processing apparatus 601 (such as a central processing unit and a graphics processing unit). The processing apparatus 601 may perform various types of appropriate operations and processing based on a program stored in the read-only memory (ROM) 602 or a program loaded from the storage apparatus 608 to the random-access memory (RAM) 603. Various programs and data required for the operation of the electronic device 600 are also stored in the RAM 603. The processing apparatus 601, the ROM 602 and the RAM 603 are connected to each other through a bus 604. An input/output (I/O) interface 605 is also connected to the bus 604.

Generally, the following apparatuses may be connected to the I/O interface 605: an input apparatus 606 such as a touch screen, a touch pad, a keyboard, a mouse, a camera, a microphone, an accelerometer and a gyroscope; an output apparatus 607 such as a liquid-crystal display (LCD), a speaker and a vibrator; the storage apparatus 608 such as a magnetic tape and a hard disk; and a communication apparatus 609. The communication apparatus 609 may allow the electronic device 600 to perform wireless or wired communication with other devices to exchange data. Although FIG. 10 shows the electronic device 600 having various apparatuses, it is to be understood that not all of the apparatuses shown herein need to be implemented or present. Alternatively, more or fewer apparatuses may be implemented or present.

Particularly, according to the embodiment of the present disclosure, the process described above with reference to the flowchart may be implemented as a computer software program. For example, the embodiment of the present disclosure includes a computer program product. The computer program product includes a computer program carried in a non-transitory computer-readable medium. The computer program includes program codes for performing the method shown in the flowchart. In such an embodiment, the computer program may be downloaded from a network and installed through the communication apparatus 609, or may be installed from the storage apparatus 608, or may be installed from the ROM 602. When the computer program is executed by the processing apparatus 601, the preceding functions defined in the method of the embodiments of the present disclosure are performed.

It is to be noted that the non-transitory computer-readable medium described above in the present disclosure may be a computer-readable signal medium or a computer-readable storage medium or any combination thereof. The computer-readable storage medium may be an electrical, magnetic, optical, electromagnetic, infrared, or semiconductor system, apparatus, or device, or any combination thereof. More specific examples of the computer-readable storage medium may include an electrical connection with one or more wires, a portable computer magnetic disk, a hard disk, a random-access memory (RAM), a read-only memory (ROM), an erasable programmable read-only memory (EPROM), a flash memory, an optical fiber, a portable compact disc read-only memory (CD-ROM), an optical memory device, a magnetic memory device or any appropriate combination thereof. In the present disclosure, the computer-readable storage medium may be any tangible medium including or storing a program. The program may be used by or in conjunction with a system, apparatus or device that executes instructions. In the present disclosure, the computer-readable signal medium may include a data signal propagated on a baseband or as a part of a carrier, and computer-readable program codes are carried in the data signal. The data signal propagated in this manner may be in multiple forms and includes an electromagnetic signal, an optical signal or any suitable combination thereof. The computer-readable signal medium may further be any computer-readable medium other than the computer-readable storage medium. The computer-readable signal medium may send, propagate or transmit a program used by or in conjunction with a system, apparatus or device that executes instructions. The program codes included on the computer-readable medium may be transmitted via any appropriate medium which includes a wire, an optical cable, a radio frequency (RF) or any appropriate combination thereof.

In some embodiments, clients and servers may communicate using any currently known or future developed network protocol, such as HTTP (HyperText Transfer Protocol), and may be interconnected with any form or medium of digital data communication (such as a communication network). Examples of the communication network include a local area network (LAN), a wide area networks (WAN), an internet (such as the Internet) and a peer-to-peer network (such as an Ad-Hoc network), as well as any currently known or future developed network.

The preceding non-transitory computer-readable medium may be included in the electronic device or may exist alone without being assembled into the electronic device.

The preceding non-transitory computer-readable medium carries one or more programs. when the one or more programs are executed by the electronic device, the electronic device is caused to perform operations described below. Comment information of multiple target videos in a video collection is acquired; a bullet comment file is generated according to the comment information; and in response to any target video in the video collection being played, the bullet comment file is loaded in segments according to a preset playing rule, and each piece of the comment information is displayed in a form of scrolling display of the bullet comment file. Operations described below are also performed: Comment information is displayed according to the method for comment information display of any one of the above technical solutions; an expansion instruction for a comment interface of any piece of the comment information is received, and the comment interface of any piece of the comment information is displayed on a current playing interface in response to the expansion instruction; and lower-level comment information of any piece of the comment information is received on the comment interface. Additionally or alternatively, the one or more programs described above may, when executed by the electronic device, cause the electronic device to perform one or more steps of the methods described in the various embodiments of the present disclosure, as well as any combination thereof.

Computer program codes for performing the operations in the present disclosure may be written in one or more programming languages or combination thereof. The preceding one or more programming languages include object-oriented programming languages such as Java, Smalltalk and C++, as well as conventional procedural programming languages such as C or similar programming languages. The program codes may be executed entirely on a user computer, partially on the user computer, as a stand-alone software package, partially on the user computer and partially on a remote computer, or entirely on the remote computer or a server. In the case relate to the remote computer, the remote computer may be connected to the user computer via any kind of network including a local area network (LAN) or a wide area network (WAN), or may be connected to an external computer (for example, via the Internet through an Internet service provider).

The flowcharts and block diagrams in the drawings show the possible functions and operations of the method, apparatus and computer program product according to various embodiments of the present disclosure. In this regard, each block in a flowchart or block diagram may represent a module, a program segment or part of codes that contains one or more executable instructions for implementing specified logical functions. It is also to be noted that in some alternative implementations, the functions in the blocks may occur in orders different from those shown in the drawings. For example, two successive blocks may in fact be executed substantially in parallel or in a reverse order, which depends on the functions involved. It is also to be noted that each block in the block diagrams and/or flowcharts and a combination of blocks in the block diagrams and/or flowcharts may be implemented by a specific-purpose hardware-based system which performs specified functions or operations or a combination of specific-purpose hardware and computer instructions.

The modules or units involved in the embodiments of the present disclosure may be implemented by software or hardware.

The functions described above herein may be performed, at least partially, by one or more hardware logic components. For example, exemplary types of hardware logic components that may be used include: a field-programmable gate array (FPGA), an application-specific integrated circuit (ASIC), an application-specific standard product (ASSP), a system on a chip (SOC), a complex programmable logic device (CPLD) and the like.

In the context of the present disclosure, a non-transitory computer-readable medium may be a tangible medium that may include or store a program that is used by or in conjunction with a system, apparatus or device that executes instructions. The non-transitory computer-readable medium may be a computer-readable signal medium or a computer-readable storage medium. The non-transitory computer-readable medium may include an electronic, magnetic, optical, electromagnetic, infrared or semiconductor system, apparatus or device or any suitable combination thereof. Concrete examples of the non-transitory computer-readable storage medium may include an electrical connection based on one or more wires, a portable computer disk, a hard disk, a random-access memory (RAM), a read-only memory (ROM), an erasable programmable read-only memory (EPROM) or a flash memory, an optical fiber, a portable compact disc read-only memory (CD-ROM), an optical storage device, a magnetic storage device, or any appropriate combination thereof.

According to one or more embodiments of the present disclosure, a method for comment information display is provided. The method includes steps described below.

Comment information of multiple target videos in a video collection is acquired.

A bullet comment file is generated according to the comment information.

In response to any target video in the video collection being played, the bullet comment file is loaded in segments according to a preset playing rule, and each piece of the comment information is displayed in a form of scrolling display of the bullet comment file.

Optionally, the step in which the each piece of the comment information is displayed in the form of the scrolling display of the bullet comment file includes the step described below.

In response to any target video being played on a video playing interface, comment information corresponding to a target video being played is displayed on the video playing interface in the form of the scrolling display of the bullet comment file.

Optionally, the step in which the each piece of the comment information is displayed in the form of the scrolling display of the bullet comment file includes the step described below.

In response to any target video being played on a video playing interface, comment information corresponding to multiple target videos in the video collection is displayed on the video playing interface in the form of the scrolling display of the bullet comment file.

In a case where target videos are switched to play, the step in which the bullet comment file is loaded in segments according to the preset playing rule includes steps described below.

In response to any target video being switched to a next target video in the video collection, a loading position of displayed comment information of the bullet comment file loaded before switching is acquired.

In response to switching to and playing the next target video, loading the bullet comment file in segments is continued from the loading position according to the preset playing rule.

Optionally, the step in which the bullet comment file is generated according to the comment information includes steps described below.

The comment information is segmented according to comment topics of the comment information to obtain multiple comment information segments.

The multiple comment information segments are sequenced according to a playing order of the multiple target videos.

Each piece of comment information in each of the multiple comment information segments is screened according to a preset screening rule, and to-be-displayed comment information in the each of the multiple comment information segments is determined.

The bullet comment file is generated based on the playing order of the multiple target videos and the to-be-displayed comment information.

Optionally, the step in which the to-be-displayed comment information in the each of the multiple comment information segments is determined includes steps described below.

Video information of the multiple target videos is acquired, and video description bullet comment information is formed based on the video information.

Screened comment information is arranged sequentially after the video description bullet comment information to form the to-be-displayed information.

Optionally, the step in which the bullet comment file is loaded in segments according to the preset playing rule, and the each piece of the comment information is displayed in the form of the scrolling display of the bullet comment file includes steps described below.

A loading request of bullet comment file segments corresponding to the multiple target videos is sent.

In response to detecting that the bullet comment file segments are not completely loaded within a response period of the loading request, loaded part of the comment information is circularly displayed, and a request for loading remaining comment information contained in the bullet comment file segments is sent.

In response to detecting that the bullet comment file segments are completely loaded within a response period of the loading request, and detecting that a difference between a playing time of the multiple target videos and a display time of complete comment information in the bullet comment file segments is greater than a preset threshold, loaded comment information is circularly displayed.

Optionally, before the step in which the each piece of the comment information is displayed in the form of the scrolling display of the bullet comment file, steps described below are included:

A heat value of the each piece of the comment information is acquired.

The heat value is displayed at the top of a comment panel corresponding to the each piece of the comment information.

Optionally, in a case where the multiple target videos in the video collection are associated with each other, the step in which the bullet comment file is generated according to the comment information includes steps described below.

The mixed comment information is screened and sequenced according to a preset screening rule and a preset sequencing rule to determine to-be-displayed comment information.

The bullet comment file of the video collection is generated based on the to-be-displayed comment information.

Optionally, after the step in which the each piece of the comment information is displayed in the form of the scrolling display of the bullet comment file, steps described below are further included.

A hot video related to a currently played target video is acquired in real time.

Associated information between the target video and the hot video is acquired, and video description information of the hot video is formed based on the associated information.

The video description information is displayed in a preset region of a target video display interface.

A display instruction of the hot video is received in the preset region, and the hot video is played in response to the display instruction.

According to one or more embodiments of the present disclosure, a method for comment information interaction is provided. The method includes steps described below.

Comment information is displayed according to the method for comment information display of any one of the above technical solutions.

An expansion instruction for a comment interface of any piece of the comment information is received, and the comment interface of any piece of the comment information is displayed on a current playing interface in response to the expansion instruction.

Lower-level comment information of any piece of the comment information is received on the comment interface.

Optionally, after the step in which the comment interface of any piece of the comment information is displayed in response to the expansion instruction, the step described below is included.

Scrolling display of multiple pieces of comment information on the playing interface is stopped when a triggering operation of closing the comment interface is detected.

Optionally, the step in which lower-level comment information of any piece of the comment information is received on the comment interface includes steps described below.

On the expanded comment interface, an anchor point having a positioning identifier is displayed to a comment area of the expanded comment interface.

The lower-level comment information of any piece of the comment information is formed based on information input in the comment area.

According to one or more embodiments of the present disclosure, an apparatus for comment information display is provided. The apparatus includes a comment information acquisition module, a bullet comment file generation module and a display module.

The comment information acquisition module is configured to acquire comment information of multiple target videos in a video collection.

The bullet comment file generation module is configured to generate a bullet comment file according to the comment information.

The display module is configured to in response to any target video in the video collection being played, load the bullet comment file in segments according to a preset playing rule, and display each piece of the comment information in a form of scrolling display of the bullet comment file.

According to one or more embodiments of the present disclosure, an apparatus for comment information interaction is further provided. The apparatus includes a comment information display module, a comment interface display module and a lower-level comment information module.

The comment information display module is configured to display comment information according to the above method for comment information display.

The comment interface display module is configured to receive an expansion instruction for a comment interface of any piece of the comment information, and display the comment interface of any piece of the comment information on a current playing interface in response to the expansion instruction.

The lower-level comment information module is configured to receive lower-level comment information of any piece of the comment information on the comment interface.

In addition, although the operations are depicted in a particular order, this should not be construed as requiring that such operations should be performed in the particular order shown or in a sequential order. In certain circumstances, multitasking and parallel processing may be advantageous. Some features described in the context of separate embodiments may also be implemented in combination in a single embodiment. Conversely, various features described in the context of a single embodiment may also be implemented in multiple embodiments, individually or in any suitable sub-combination. Conversely, the specific features and acts described above are merely exemplary forms of implementing the claims.

Through the solution for comment information display of the present disclosure, a client acquires comment information of a plurality of target videos and achieves preloading of the comment information, which is conducive to quickly loading corresponding comment information when a target video is played and shortening the loading time of the comment information, so as to smoothly display the comment information on a playing picture of the target video.

In addition, in the present disclosure, to-be-displayed comment information is integrated into the form of a bullet comment file, that is, a bullet comment file collects comment information corresponding to multiple target videos. When a target video in a video collection is displayed, the corresponding bullet comment file is loaded, and the comment information in the bullet comment file is sequentially displayed through scrolling on a playing interface. Compared with the manner that a bullet comment file corresponds to a single video in the related art, the present disclosure provides a new manner for bullet comment display.

According to the solution for comment information display of the present disclosure, each target video and each piece of comment information are displayed correspondingly, so that a target video and comment information of the target video are displayed simultaneously. Comment information of all target videos is acquired, all comment information is preloaded, and then the comment information is sequenced according to a playing order of the target videos, so that corresponding segments of the bullet comment file can be loaded quickly when target videos are displayed. The comment information in the bullet comment file is preloaded and sequenced, which is conducive to reducing the loading time of each piece of comment information in the bullet comment file and improving the display efficiency of comment information displayed on a target video playing picture.

Moreover, according to the solution for comment information display of the present disclosure, the bullet comment file only needs to be retrieved once to load the comment information of all target videos. In this way, the efficiency of loading the comment information is improved, and the problem is solved that the comment information cannot be displayed in the form of bullet comments due to the long loading time of the comment information.

The to-be-displayed comment information of the present disclosure is obtained through screening, filtering and sequencing on comment information. Screened to-be-displayed comment information may be used for displaying hot comments or classic comments, and then the to-be-screened to-be-displayed comment information is filtered, so that the number of words and content of the to-be-displayed comment information satisfies the standard of displaying bullet comments on short videos.

According to the solution for comment information interaction of the present disclosure, when the comment information is displayed through scrolling on a playing interface of a current target video, an expansion instruction for a comment interface of the piece of the comment information is received, and lower-level comment information of any piece of the comment information is formed on the comment interface to allow the interaction of the comment information. In this way, the heat value of the comment information is improved, and the interaction between different users is enhanced.

What is claimed is:

1. A method for comment information display, comprising:
    acquiring comment information of a plurality of target videos in a video collection;
    generating a bullet comment file according to the comment information; and
    in response to any target video in the video collection being played, loading the bullet comment file in segments according to a preset playing rule, and displaying each piece of the comment information in a form of scrolling display of the bullet comment file;
    wherein the step of loading the bullet comment file in segments according to the preset playing rule, and displaying the each piece of the comment information in the form of the scrolling display of the bullet comment file comprises:
    sending a loading request of bullet comment file segments corresponding to the plurality of target videos; and
    in response to detecting that the bullet comment file segments are not completely loaded within a response period of the loading request, circularly displaying loaded part of the comment information, and sending a request for loading remaining comment information contained in the bullet comment file segments;
    in response to detecting that the bullet comment file segments are completely loaded within a response period of the loading request, and detecting that a difference between a playing time of the plurality of target videos and a display time of complete comment information in the bullet comment file segments is greater than a preset threshold, circularly displaying loaded comment information.

2. The method for comment information display according to claim 1, wherein the step of displaying the each piece of the comment information in the form of the scrolling display of the bullet comment file comprises:
    in response to any target video being played on a video playing interface, displaying comment information corresponding to a target video being played on the video playing interface in the form of the scrolling display of the bullet comment file.

3. The method for comment information display according to claim 1, wherein the step of displaying the each piece of the comment information in the form of the scrolling display of the bullet comment file comprises:
    in response to any target video being played on a video playing interface, displaying comment information corresponding to a plurality of target videos in the video collection on the video playing interface in the form of the scrolling display of the bullet comment file.

4. The method for comment information display according to claim 1, wherein the step of loading the bullet comment file in segments according to the preset playing rule further comprises:
    in a case where target videos are switched to play, in response to any target video being switched to a next target video in the video collection, acquiring a loading position of displayed comment information of the bullet comment file loaded before switching; and
    in response to switching to and playing the next target video, continuing loading the bullet comment file in segments from the loading position according to the preset playing rule.

5. The method for comment information display according to claim 1, wherein the step of generating the bullet comment file according to the comment information comprises:
    segmenting the comment information according to comment topics of the comment information to obtain a plurality of comment information segments;
    sequencing the plurality of comment information segments according to a playing order of the plurality of target videos;
    screening each piece of comment information in each of the plurality of comment information segments according to a preset screening rule, and determining to-be-displayed comment information in the each of the plurality of comment information segments; and
    generating the bullet comment file based on the playing order of the plurality of target videos and the to-be-displayed comment information.

6. The method for comment information display according to claim 5, wherein the step of determining the to-be-displayed comment information in the each of the plurality of comment information segments comprises:
    acquiring video information of the plurality of target videos, and forming video description bullet comment information based on the video information; and
    arranging screened comment information sequentially after the video description bullet comment information to form the to-be-displayed information.

7. The method for comment information display according to claim 1, further comprising:
    before the step of displaying the each piece of the comment information in the form of the scrolling display of the bullet comment file, acquiring a heat value of the each piece of the comment information; and
    displaying the heat value at the top of a comment panel corresponding to the each piece of the comment information.

8. The method for comment information display according to claim 1, wherein the step of generating the bullet comment file according to the comment information comprises:

in a case where the plurality of target videos in the video collection are associated with each other, screening and sequencing the comment information according to a preset screening rule and a preset sequencing rule to determine to-be-displayed comment information; and
generating the bullet comment file of the video collection based on the to-be-displayed comment information.

9. The method for comment information display according to claim 5, further comprising:

after the step of displaying the each piece of the comment information in the form of the scrolling display of the bullet comment file, acquiring a hot video related to a currently played target video in real time;
acquiring associated information between the currently played target video and the hot video, and forming video description information of the hot video based on the associated information;
displaying the video description information in a preset region of a target video display interface; and
receiving a display instruction of the hot video in the preset region, and playing the hot video in response to the display instruction.

10. The method for comment information display according to claim 8, further comprising:

after the step of displaying the each piece of the comment information in the form of the scrolling display of the bullet comment file, acquiring a hot video related to a currently played target video in real time;
acquiring associated information between the currently played target video and the hot video, and forming video description information of the hot video based on the associated information;
displaying the video description information in a preset region of a target video display interface; and
receiving a display instruction of the hot video in the preset region, and playing the hot video in response to the display instruction.

11. A method for comment information interaction, comprising:

displaying comment information according to a method for comment information display;
receiving an expansion instruction for a comment interface of any piece of the comment information, and displaying the comment interface of any piece of the comment information on a current playing interface in response to the expansion instruction; and
receiving lower-level comment information of any piece of the comment information on the comment interface, wherein the method for comment information display comprises:
acquiring comment information of a plurality of target videos in a video collection;
generating a bullet comment file according to the comment information; and
in response to any target video in the video collection being played, loading the bullet comment file in segments according to a preset playing rule, and displaying each piece of the comment information in a form of scrolling display of the bullet comment file;
wherein the step of loading the bullet comment file in segments according to the preset playing rule, and displaying the each piece of the comment information in the form of the scrolling display of the bullet comment file comprises:
sending a loading request of bullet comment file segments corresponding to the plurality of target videos; and
in response to detecting that the bullet comment file segments are not completely loaded within a response period of the loading request, circularly displaying loaded part of the comment information, and sending a request for loading remaining comment information contained in the bullet comment file segments;
in response to detecting that the bullet comment file segments are completely loaded within a response period of the loading request, and detecting that a difference between a playing time of the plurality of target videos and a display time of complete comment information in the bullet comment file segments is greater than a preset threshold, circularly displaying loaded comment information.

12. The method for comment information interaction according to claim 11, wherein the step of displaying the each piece of the comment information in the form of the scrolling display of the bullet comment file comprises:

in response to any target video being played on a video playing interface, displaying comment information corresponding to a target video being played on the video playing interface in the form of the scrolling display of the bullet comment file.

13. The method for comment information interaction according to claim 11, wherein the step of displaying the each piece of the comment information in the form of the scrolling display of the bullet comment file comprises:

in response to any target video being played on a video playing interface, displaying comment information corresponding to a plurality of target videos in the video collection on the video playing interface in the form of the scrolling display of the bullet comment file.

14. The method for comment information interaction according to claim 11, wherein the step of loading the bullet comment file in segments according to the preset playing rule further comprises:

in a case where target videos are switched to play, in response to any target video being switched to a next target video in the video collection, acquiring a loading position of displayed comment information of the bullet comment file loaded before switching; and
in response to switching to and playing the next target video, continuing loading the bullet comment file in segments from the loading position according to the preset playing rule.

15. The method for comment information interaction according to claim 11, wherein the step of generating the bullet comment file according to the comment information comprises:

segmenting the comment information according to comment topics of the comment information to obtain a plurality of comment information segments;
sequencing the plurality of comment information segments according to a playing order of the plurality of target videos;
screening each piece of comment information in each of the plurality of comment information segments according to a preset screening rule, and determining to-be-displayed comment information in the each of the plurality of comment information segments; and generating the bullet comment file based on the playing order of the plurality of target videos and the to-be-displayed comment information.

16. The method for comment information interaction according to claim 11, further comprising:

after the step of displaying the comment interface of any piece of the comment information on a current playing interface in response to the expansion instruction, stopping scrolling display of a plurality of pieces of comment information on the playing interface when a triggering operation of closing the comment interface is detected.

17. The method for comment information interaction according to claim 11, further comprising:

after the step of receiving the lower-level comment information of any piece of the comment information on the comment interface, on an expanded comment interface, displaying an anchor point having a positioning identifier to a comment area of the expanded comment interface; and forming the lower-level comment information of any piece of the comment information based on information input in the comment area.

18. An electronic device, comprising:

a memory and a processor; wherein the memory is configured to store a computer program; and the processor is configured to execute, when running the computer program, a method for comment information display, wherein the method for comment information display comprises:

acquiring comment information of a plurality of target videos in a video collection;

generating a bullet comment file according to the comment information; and in response to any target video in the video collection being played, loading the bullet comment file in segments according to a preset playing rule, and displaying each piece of the comment information in a form of scrolling display of the bullet comment file;

wherein the step of loading the bullet comment file in segments according to the preset playing rule, and displaying the each piece of the comment information in the form of the scrolling display of the bullet comment file comprises:

sending a loading request of bullet comment file segments corresponding to the plurality of target videos; and in response to detecting that the bullet comment file segments are not completely loaded within a response period of the loading request, circularly displaying loaded part of the comment information, and sending a request for loading remaining comment information contained in the bullet comment file segments;

in response to detecting that the bullet comment file segments are completely loaded within a response period of the loading request, and detecting that a difference between a playing time of the plurality of target videos and a display time of complete comment information in the bullet comment file segments is greater than a preset threshold, circularly displaying loaded comment information.

19. A non-transitory computer-readable storage medium storing a computer program, wherein the computer program is configured to, when executed by a processor, implement the method for comment information display, wherein the method for comment information display comprises:

acquiring comment information of a plurality of target videos in a video collection;

generating a bullet comment file according to the comment information; and in response to any target video in the video collection being played, loading the bullet comment file in segments according to a preset playing rule, and displaying each piece of the comment information in a form of scrolling display of the bullet comment file;

wherein the step of loading the bullet comment file in segments according to the preset playing rule, and displaying the each piece of the comment information in the form of the scrolling display of the bullet comment file comprises:

sending a loading request of bullet comment file segments corresponding to the plurality of target videos; and in response to detecting that the bullet comment file segments are not completely loaded within a response period of the loading request, circularly displaying loaded part of the comment information, and sending a request for loading remaining comment information contained in the bullet comment file segments;

in response to detecting that the bullet comment file segments are completely loaded within a response period of the loading request, and detecting that a difference between a playing time of the plurality of target videos and a display time of complete comment information in the bullet comment file segments is greater than a preset threshold, circularly displaying loaded comment information.

* * * * *